UNITED STATES PATENT OFFICE.

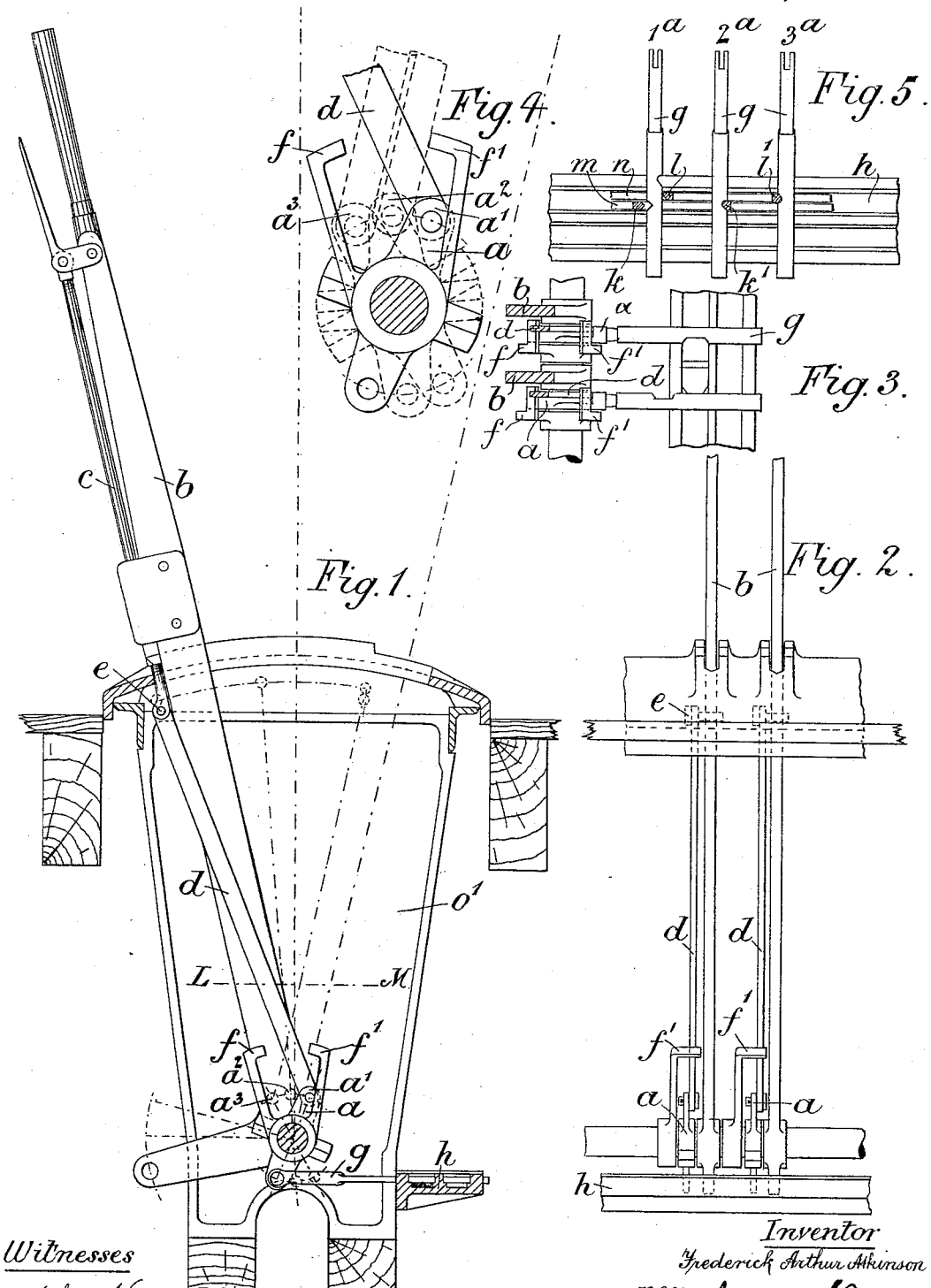
(No Model.)
F. A. ATKINSON.
INTERLOCKING RAILWAY POINT AND SIGNAL APPARATUS.
No. 484,840. Patented Oct. 25, 1892.

FREDERICK ARTHUR ATKINSON, OF WORCESTER, ENGLAND.

INTERLOCKING RAILWAY POINT AND SIGNAL APPARATUS.

SPECIFICATION forming part of Letters Patent No. 484,840, dated October 25, 1892.

Application filed February 16, 1892. Serial No. 421,677. (No model.) Patented in England January 27, 1891, No. 1,463.

*To all whom it may concern:*

Be it known that I, FREDERICK ARTHUR ATKINSON, a subject of the Queen of Great Britain and Ireland, residing at St. Wulstan's Crescent, in the city of Worcester, county of Worcester, England, have invented certain new and useful Improvements in Apparatus for Working and Interlocking Points and Signals on Railways, (for which Letters Patent were granted to me in England, No. 1,463, dated January 27, 1891;) and I do hereby declare the following to be a full, clear, and exact description of the invention, such as will enable others skilled in the art to which it appertains to make and use the same.

My invention relates to the method of working the locking-gear known as "tappet-locking," in conjunction with the spring-catch-handle movement; and it consists in improved apparatus whereby a reduced movement or less travel is given to the plunger.

The improved apparatus is equally applicable to types of locking-gear other than tappet.

In carrying out my invention I introduce a motion-piece working on the same center or pivot as the main lever or working on a center situated anywhere in the center line of motion or travel of the main lever claw-stops being advantageously provided for operating the motion-piece for the purpose hereinafter more fully described. To this motion-piece I connect the spring-catch-rod end by means of a light iron bar or link, and for this purpose the catch-rod end is continued beneath the floor-plate of the apparatus to any suitable distance, and to the said motion-piece is also connected the locking-gear.

In order to enable the invention to be fully understood, I will proceed to describe the same by reference to the accompanying drawings, in which—

Figure 1 is a side elevation of my improvements as applied to tappet-locking apparatus. Fig. 2 is a front elevation. Fig. 3 is a plan, section L M, Fig. 1, without casting $o'$. Fig. 4 is an enlarged view of the motion-piece, showing the various movements of the connecting link or bar; and Fig. 5 is a plan of a two-channel locking-box.

$a$ is my motion-piece pivoted in the center line of motion of the main apparatus lever $b$, the motion-piece $a$ being so arranged that when the spring catch-rod $c$ is raised the connecting link or bar $d$, acting on the motion-piece $a$, imparts movement to the locking-gear, such movement being sufficient for locking purposes.

$e$ is the catch-rod end, to which is connected the connecting-link $d$.

$f f'$ are the claw-stops.

$g$ is the plunger, and $h$ is the locking-box.

The operation is as follows: On the catch-rod $c$ being raised by its handle to release the main lever $b$ the motion-piece $a$ is caused to move from $a'$ to $a^2$, Figs. 1 and 4, in consequence of being attached by the connecting-link $d$ to the catch-rod end $e$, whereby movement is communicated to the plunger $g$, which effects the necessary interlocking in the locking-box $h$ before the actual travel of the main lever $b$ is commenced. During the travel of the main lever $b$ the motion-piece $a$ remains stationary at $a^2$, Figs. 1 and 4, owing to the connecting-point between the connecting link or bar $d$ and the motion-piece $a$ acting as a pivot or center on which the catch-rod end $e$ and connecting link $d$ turn. During the last half of the movement of the main lever $b$ the connecting-link $d$ comes against one of the claw-stops $f$ and turns the motion-piece $a$ just over the center, whereby any jambing on dead-centers of the catch-handle rod, connecting-link, and motion-piece is prevented. The travel of the main lever $b$ is then completed and the catch-rod $c$ is let down to secure the said main lever $b$, and thereby another movement from $a^2$ to $a^3$, Figs. 1 and 4, is communicated to the motion-piece $a$, whereby a further movement in the same direction as the first is given to the plunger $g$, and the releasing or other movement required in the interlocking gear is effected. It will thus be seen that the action of the stops $f f'$ on the connecting bars or links $d$, as shown in the drawings, whereby the motion-pieces are thrown over the center, insures a continuous motion in one direction being given to the plungers of the locking mechanism—that is to say, although the first movement of the spring catch-rod to release the main lever is upward and the last movement to secure the same again in position is downward, a continuous movement in one direction only is given to the locking-gear.

The plungers $1^a$ $2^a$ $3^a$, Fig. 5, move through the locking-box and actuate locks $k$ $k'$ or $l$ $l'$, mounted on cross-slides $m$ $n$, and lock or release the plungers $g$, according to which lever is moved. It will be seen that lever 1 is necessary to be moved forward in order that lever 3 may be moved, as the lock $l'$ in the plunger $3^a$, attached to lever 3, prevents lever 3 from being moved. It will be seen that the movement of lever 1, operating the plunger attached to it, (numbered $1^a$,) will present a notch upon the completion of its movement to the lock $l$, and would thereby allow the movement of the plunger $3^a$, thrusting out the lock $l'$ and placing the lock $l$ into the notch in the plunger $1^a$.

Having fully described my invention, what I claim, and desire to secure by Letters Patent, is—

1. The combination, with the pivoted main operating-lever and its catch-rod, of an oscillatory motion-piece $a$, a plunger $g$, pivoted to the motion-piece and adapted to actuate the locking devices, and a link pivoted to the said catch-rod and to the upper end of the said motion-piece, whereby the upper end of the said motion-piece is moved from the central line of the said operating-lever when the catch-rod is released and is placed on the said center line when the catch-rod is raised to permit the said lever to be operated, substantially as set forth.

2. The combination, with the pivoted main operating-lever and its catch-rod, of an oscillatory motion-piece $a$, a plunger $g$, pivoted to the motion-piece and adapted to actuate the locking devices, stops arranged at the opposite sides of the motion-piece and adapted to prevent it from sticking in a central position, and a link pivoted to the said catch-rod and to the upper end of the said motion-piece, whereby the upper end of the said motion-piece is moved from the center line of the operating-lever when the catch-rod is released and is placed on the said center line when the catch-rod is raised to permit the said lever to be operated, substantially as set forth.

In testimony whereof I affix my signature in the presence of two witnesses.

FREDERICK ARTHUR ATKINSON.

Witnesses:
CHARLES T. E. CLARKE,
*Solicitor, Worcester.*
FRED. WADELY,
*Clerk to Mr. J. H. Hooper, Solicitor and Notary, Worcester.*